United States Patent [19]

Atkins

[11] 4,294,895
[45] Oct. 13, 1981

[54] BATTERY VENT CAP FOR PREVENTING ELECTROLYTE FOAM ESCAPE

[75] Inventor: Larry P. Atkins, Daleville, Ind.

[73] Assignee: General Motors Corporation, Detroit, Mich.

[21] Appl. No.: 168,276

[22] Filed: Jul. 10, 1980

[51] Int. Cl.³ .............................................. H01M 2/12
[52] U.S. Cl. ....................................... 429/84; 429/89; 220/373
[58] Field of Search .................. 429/89, 86, 84, 82, 429/83, 53–55, 72; 220/367, 368, 373, DIG. 27

[56] References Cited

U.S. PATENT DOCUMENTS

| 844,755 | 2/1907 | Schalow | 429/55 |
| 1,130,977 | 3/1915 | Hutchison | 429/86 |
| 1,331,795 | 2/1920 | Bachman | 429/83 |
| 2,124,455 | 7/1938 | Hopkins | 429/84 |
| 2,565,674 | 8/1951 | Zachlin | 429/82 |
| 2,615,062 | 10/1952 | Craig | 429/86 |
| 2,646,459 | 7/1953 | Gill | 429/84 |

Primary Examiner—Anthony Skapars
Attorney, Agent, or Firm—Douglas D. Fekete

[57] ABSTRACT

A battery vent cap is presented for releasing gases from a battery container while preventing the escape of electrolyte foam. The cap comprises a strategically located reservoir containing an antifoam agent for dissipating foam attempting to escape. Further, minute amounts of agent are intermittently dispensed into the cell to reduce foaming therein.

5 Claims, 3 Drawing Figures

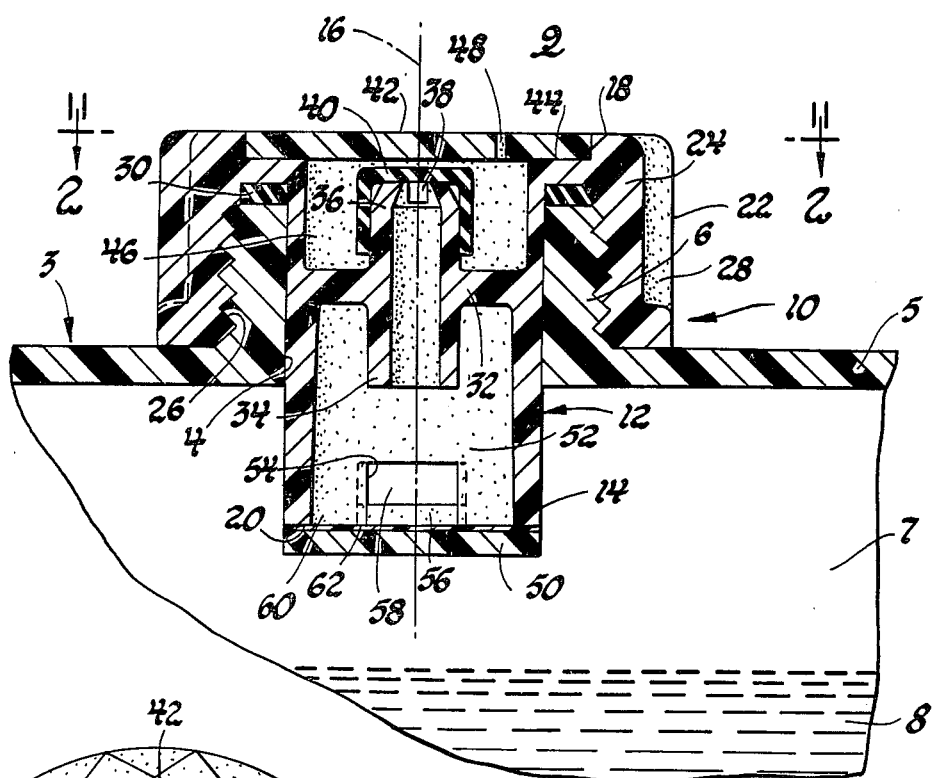
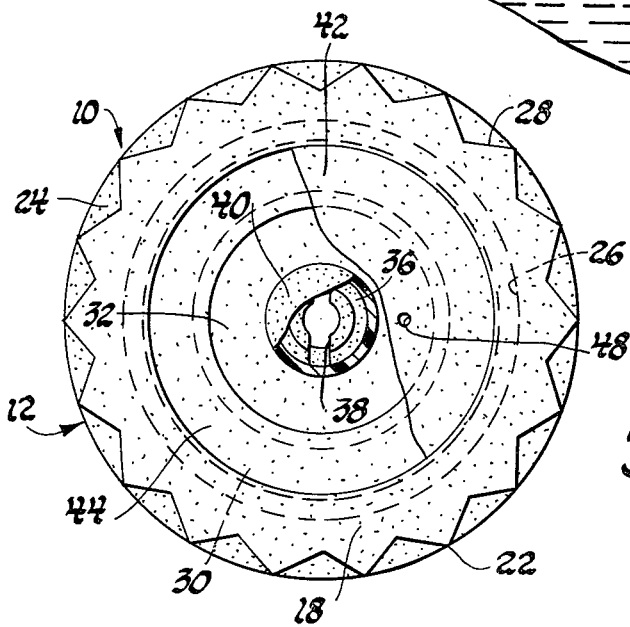
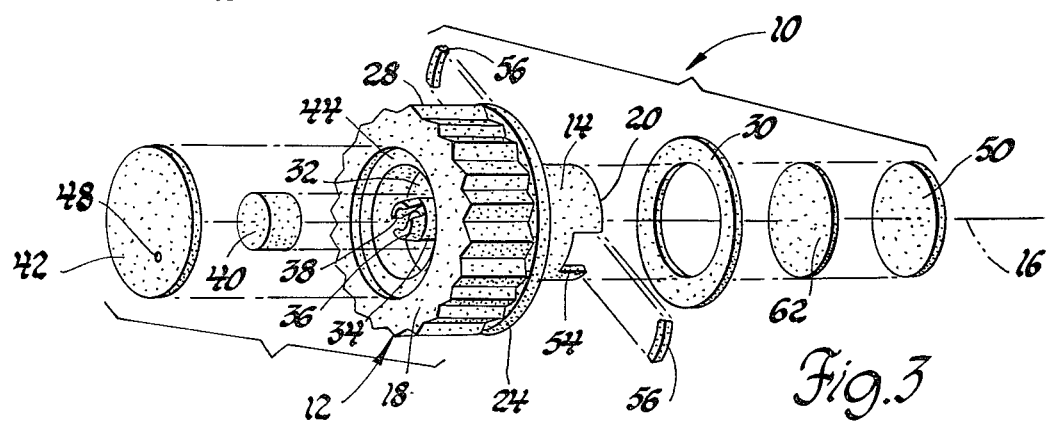

BATTERY VENT CAP FOR PREVENTING ELECTROLYTE FOAM ESCAPE

BACKGROUND OF THE INVENTION

This invention relates to a battery vent cap adapted to vent gases generated during cell operation and prevent the escape of electrolyte foam. More particularly, this invention relates to a vent cap comprising strategically located reservoir of an antifoam agent for dissipating electrolyte-laden foam attempting to escape from the battery through the cap, while readily venting foam-free gases from the cell.

The elements of a zinc-nickel oxide secondary electrochemical cell and aqueous alkaline electrolyte are typically arranged within a container that is sealed except for a vent provided to release gases formed during cell operations, particularly charging. The vent is preferably through a removable cap mounted in the container top, which also provides access to the cell for adding water to replenish the electrolyte. Normally, the gases bubble up through the electrolyte and are vented to the ambient atmosphere. However, wetting agents included in certain cell elements may leach into the alkaline electrolyte. These agents alter the surface activity of the electrolyte so that the bubbles do not break up, but instead form a tenacious foam. This electrolyte foam seeps through the vent and is lost out the cell. The escaped foam corrodes electrical connections to the container or creates voltage shunts that reduce the cell output.

One method for preventing foaming is to add a silicone-base antifoam agent to the electrolyte. The antifoam agent dissipates the foam without significant interference with cell operations. However, the agent loses its effectiveness after a short time, apparently because the alkaline electrolyte decomposes the silicone-base compound. Thus, periodic additions are required to prevent foam from escaping out the cell. Because of the very short time that the agent remains effective, typically only several minutes, these additions have not been practical for a cell in normal field use.

Therefore, it is an object of this invention to provide a device that is adapted to be mounted in a container for an electrochemical cell for venting gases therefrom while preventing the escape of electrolyte carried along with the gases as a foam. The device is adapted to contain a reservoir of antifoam agent that is strategically located to dissipate the foam before it escapes the cell and to thereby free the gases for venting.

It is a further object of this invention to provide a vent device for an electrochemical cell having an aqueous alkaline electrolyte, which device comprises a reservoir that is adapted to contain a silicone-base antifoam agent away from contact with the electrolyte and to intermittently dispense minute amounts of the agent into the foam to at least partially dissipate it. The device thus provides foam-free venting of gases from the cell over an extended time suitable for normal field use.

SUMMARY OF THE INVENTION

In accordance with a preferred embodiment, these and other objects are accomplished by a vent device that is adapted to be mounted in a container of an electrochemical cell and includes a foam treatment compartment having a reservoir in the bottom thereof for a silicone-base antifoam agent. In the reservoir is a fabric mat to retain the agent against spilling. A gas outlet passage from the top of the compartment leads indirectly to the atmosphere through a one-way valve for venting gases from the cell, but preventing ambient air from entering the cell and contaminating the electrolyte. At least one opening is provided to the compartment at a point above the reservoir for admitting foam from the cell into the compartment for treatment by the agent.

When the vent device of this invention is mounted in a container of an electrochemical cell having an alkaline electrolyte, the antifoam agent in the reservoir is protected from contact with the bulk of the electrolyte. Foam within the cell rises unchecked until reaching the opening to the compartment. The foam then spills into the compartment through the opening, touches the antifoam agent in the reservoir and is almost instantly dissipated, thereby freeing the gases for venting. Thus, the reservoir is strategically located to guard against foam attempting to escape the cell through the gas outlet passage. A further feature of the preferred embodiment of this invention is that, when the foam comes into contact with the antifoam agent, it picks up a minute amount of the agent. This agent continues to dissipate foam away from the reservoir and is carried by the dissipating foam out the opening of the compartment and into the cell. Thus, the device dispenses agent into the cell to generally reduce the foam therein and, in some instances, completely defoam the cell. After the dispensed agent loses its effectiveness, the foam rises until again spilling into the compartment. Since the reservoir only intermittently comes into contact with foam and then only a minute amount of antifoam agent is dispensed, the device is capable of controlling foam in a cell for a period of time suitable for in-field operations.

DESCRIPTION OF THE DRAWINGS

The present invention will be further illustrated with reference to the accompanying drawings wherein like numerals are employed to designate like elements:

FIG. 1 is a cross-sectional view of the preferred vent device of this invention mounted in a container of an electrochemical cell;

FIG. 2 is an end view, partially cut away, of the vent cap in FIG. 1 looking in the direction of Arrow 2; and FIG. 3 is an exploded perspective view of the preferred vent device in FIGS. 1 and 2 and showing the several elements employed in its construction.

DETAILED DESCRIPTION OF THE INVENTION

Referring now to the Figures, a preferred vent cap 10 of this invention is intended to be mounted through an opening 4 in a cover 5 of a battery container 3 (shown only in part) by screwing onto an externally threaded cylindrical boss 6 extending upwardly about opening 4. Cap 10 is adapted to vent gases from a space 7 above electrolyte 8 within the container to the surrounding atmosphere 9.

Vent cap 10 comprises a mushroom-shaped housing member 12 having a tubular side wall 14 that is generally cylindrical about vertical axis 16. Housing member 12 features a top end 18 lying outside the container 3 and a bottom end 20 lying within the container. Housing member 12 also comprises an integrally molded container-attachment portion 22 radially protruding from end 18 and comprising a concentric depending flange or skirt 24 having a threaded internal surface 26 and a toothed outer surface 28. Threaded surface 26 is adapted to engage a threaded boss 6 on cover 5. A rubber washer 30 is provided around wall 14 under skirt 24 for engaging the top of boss 6 and hermetically sealing vent cap 10 to cover 5. Toothed surface 28 enables cap 10 to be firmly gripped during screwing and unscrewing, which is preferably performed manually.

Housing member 12 also comprises an integrally molded transverse wall 32, situated intermediate ends 18 and 20. A generally cylindrical tube 34 extends coaxially through wall 32 and is integrally formed therewith. Upper end 36 of tube 34, extending in the direction of top end 18, is inwardly tapered and provided with a slotted opening 38. A valve cap 40 fits snugly over end 36.

A circular end wall 42 is fitted into an annular ledge 44 in top end 18. End wall 42 cooperates with side wall 14 and transverse wall 32 to define an upper compartment 46 within which lies upper end 36 of tube 34 and cap 40. An opening 48 in end wall 42 connects compartment 46 with the atmosphere 9. Opening 48 is off axis 16 by a distance sufficient to prevent it from vertically overlapping cap 40.

As seen in FIG. 1, a small distance is provided between cap 40 and end wall 42 when cap 40 is fitted down against tube end 36. Thus, tube 34, slotted opening 38, cap 40, compartment 46 and aperture 48 form a one-way valve. In addition to a tendency to foam, an alkaline solution employed as electrolyte 8 tends to become carbonated when exposed to air, which reduces its effectiveness. Therefore, the one-way valve permits gases to vent, but prevents ambient air flow into the battery. Gases flowing outward through tube 34 and slotted opening 38 slide cap 40 axially against wall 42 and is thereby able to flow into compartment 46 and out aperture 48. However, gases flowing through aperture 48 into chamber 46 slide cap 40 snugly against end 36, sealing off slotted opening 38.

A solid circular end wall 50 is glued to housing member bottom end 20 and cooperates with side wall 14 and transverse wall 32 to define a lower chamber 52. Two slots 54 in side wall 14 are diametrically opposite and extend from bottom end 20. Each slot 54 is partially closed by a dam member 56 adjacent end 50, thereby forming an opening 58 in side wall 14 spaced apart from end 50 and also a reservoir 60 in the bottom of chamber 52 for containing an antifoam agent. A thin mat 62 of nonwoven nylon fabric covers the bottom of chamber 52 and is peripherally interposed between end 20 and wall 50 to hold it in position. Mat 62 absorbs antifoam agent and reduces spillage.

A preferred antifoam agent is a silicone-base surfactant commercially available from the Dow Corning Corporation, South Saginaw Road, Midland, Michigan, under the trade designation Antifoam A. Antifoam A is believed to be the reaction product of an alkoxy-substituted siloxane and a polyether compound, such as polyethylene or polypropylene. In water, the agent lowers the surface tension and thereby dissipates foam. However, the agent decomposes in an alkaline solution and, therefor, is effective for only a limited time. Although Antifoam A is preferred, other suitable silicone-base anti-foam agents are available, such as Dow Corning DB-110A Antifoam Emulsion.

Before mounting, about 0.2 ml of the preferred antifoam agent was syringed in reservoir 60 through opening 58 and mainly absorbed by mat 62. After vent cap 10 is screwed onto boss 6, the cell is sealed except through vent cap 10. During cell operation, foam-free gases are readily vented through opening 58 into lower chamber 52, and thereafter through tube 34, about valve cap 40, through upper chamber 46 and out opening 48 to the atmosphere 9. When foaming occurs, the foam builds up in the space 7 above the electrolyte 8 until reaching opening 58 in vent cap 10, whereupon it spills over dam members 56 into reservoir 60 and is rapidly dissipated by the antifoam agent. Thus, the gases are freed from the foam for venting and the electrolyte is prevented from seeping out the cell. In addition, a small amount of antifoam agent is picked up by the foam upon contact. This pick-up causes the foam to erode through opening 58 and within space 7. Sometimes all the foam within the battery may be dissipated. However, generally only the foam immediately about vent cap 10 breaks up before the agent loses its effectiveness, either because of decomposition or, more likely, dilution. Thereafter, the foam again builds up until reaching the vent cap 10. Thus, the antifoam agent in reservoir 60 is not only protected from the electrolyte solution 8, but is also protected, except for the intermittent contact, from the electrolyte foam. Some electrolyte unavoidably accumulates in the reservoir because of the foaming and also spraying. This electrolyte may decompose some agent and occasionally overflows the reservoir carrying away agent. These losses are minor and the vent cap 10 is capable of controlling foam escape for a suitable period of time for in-field battery use.

Obviously, as agent is dispensed into the cell, the reservoir becomes depleted. The reservoir is conveniently replenished by unscrewing vent cap 10 and adding fresh agent through the opening 58, preferably at the same time water is added to replenish the electrolyte. The frequency depends upon several factors including spillage and the severity of gasing and foaming.

As seen in FIG. 3, the preferred vent cap of this invention is manufactured with a minimal number of elements. Housing members 12 and end walls 42 and 50 are suitably molded of a rigid styrene-acrylonitrile. Valve cap 40 and washer 30 are adapted to form seals and are suitably formed of a resilient butyl rubber. In the preferred embodiment, openings 58 and reservoir 60 were formed by molding slots 54 in housing side wall 14 and suitably gluing dam members 56 into the slots. It is apparent that suitable openings may be molded or otherwise formed directly in the side wall. In another embodiment, an annular boss is integrally molded on the inner surface of the lower end wall. The boss is adapted to snugly fit within the generally annular bottom end 20 of housing member 12 and to cooperate with slots 54 to form the openings without dam members 56. The area within the boss forms the reservoir. The integrally molded boss is particularly advantageous for automatically assembling the end wall to the housing member.

In the preferred embodiment, the vent cap contains a silicone-base agent to control a foamable alkaline electrolyte. It is apparent that the cap may be employed to contain other antifoaming or defoaming agents or to control other foamable electrolytes. Also, although the preferred vent cap features a particular one-way valve comprising a capped tube to prevent air from carbonating an alkaline electrolyte, other valves may be suitably substituted. Obviously, a valve is not necessary for electrolyte solutions that are not contaminated by air contact. In addition, a porous member may be inserted into the gas outlet from the reservoir compartment to diffuse a flame before it can enter the cell.

Although this invention has been described in terms of certain embodiments thereof, it is not intended to be limited to the above description, but rather only to the extent set forth in the claims that follow.

The embodiments of the invention in which an exclusive property or priviledge is claimed are defined as follows:

1. A vent device for releasing gases formed in a battery container while preventing the escape of electrolyte that may be carried with the gas in the form of foam, said vent device comprising;
   a housing comprising a cylindrical side wall and transverse walls defining a compartment, said housing being adapted to be vertically mounted in the container such that the-then lower transverse wall lies inside the container,
   a gas passage adapted for venting the compartment to outside the container,
   at least one opening in the housing side wall spaced apart from the lower transverse wall and adapted to connect the compartment to inside the container for admitting gases and foam, and
   a reservoir within the compartment between the opening and the lower end wall and containing an antifoam agent, said reservoir, gas passage and opening defining a gas-foam flow path through the compartment such that foam entering the compartment through the opening spills into the reservoir whereupon the agent dissipates the foam and foam-free gas flows to the gas passage unimpeded by the agent.

2. A vent device for releasing gases formed in a battery container while preventing the escape of electrolyte that may be carried with the gas in the form of a foam, and vent device comprising
   a compartment within the device and comprising a cylindrical peripheral wall and transverse walls,
   means for mounting the device through an opening in the container such that the compartment lies therein with the peripheral wall vertically oriented and the transverse walls in upper and lower relationship,
   a gas passage for venting gases, said passage extending through the compartment upper wall to outside the container and comprising a one-way valve permitting gas flow outward from the compartment but preventing gas flow from outside the container into the compartment,
   an opening through the compartment peripheral wall spaced apart from the lower wall and adapted to connect the compartment to inside the container for admitting foam into the compartment, and
   a reservoir within the compartment between the opening and the lower wall and comprising a fabric mat and a silicone-base antifoam agent that is at least partially absorbed by the mat, said reservoir positioned so that foam entering the compartment through the opening spills into the reservoir and is dissipated by the agent and foam-free gas rises away from the reservoir to the vent passage.

3. A vent device for releasing gases from a battery container while preventing the escape of electrolyte foam, said vent device comprising
   a compartment having an opening for admitting gas and foam to the compartment and a vent for exhausting gas from the compartment, and
   a body of an antifoam agent adapted to dissipate electrolyte foam and located within the compartment such that foam entering through the opening contacts the agent and is dissipated thereby.

4. A vent device for releasing gases from a battery container while preventing the escape of electrolyte foam, said vent device comprising
   a body adapted to be operatively connected to the container and comprising
   a compartment,
   an opening for admitting gases and foam to the compartment and adapted to communicate with an interior of the battery container when the body is connected thereto,
   a vent passage for exhausting gases from the compartment and adapted to vent gases to outside the container when the body is connected thereto, and
   a reservoir within the compartment and containing an antifoam agent, and reservoir being sized and positioned such that gases flowing through the compartment from the opening to the vent passage do not flow through the agent and foam entering the compartment contacts the agent and is thereby dissipated.

5. A vent device for releasing gases from a battery container while preventing the escape of electrolyte foam, said vent device adapted to be operatively connected to the container and comprising
   a compartment,
   an opening for admitting gases and foam to the compartment and adapted to communicate with an interior of the battery container when the body is connected thereto,
   a vent passage for exhausting gases from the compartment and adapted to vent gases to outside the container when the body is connected thereto, and
   absorptive means retaining an antifoam agent and positioned within the compartment with respect to the opening such that foam entering from the container interior spills onto the means whereupon the means dispenses a minute amount of agent effective to dissipate the foam and such that dissipating foam carries agent away from the absorptive means and out the opening to dissipate foam within the container interior.

* * * * *

UNITED STATES PATENT AND TRADEMARK OFFICE
CERTIFICATE OF CORRECTION

PATENT NO. : 4,294,895
DATED : October 13, 1981
INVENTOR(S) : Larry P. Atkins

It is certified that error appears in the above-identified patent and that said Letters Patent are hereby corrected as shown below:

Column 1, line 9, after "comprising" insert -- a --.

Column 5, claim 2, line 35, "and" should read -- said --.

Column 6, claim 4, line 29, after "agent", "and" should read -- said --.

Signed and Sealed this

Ninth Day of February 1982

[SEAL]

Attest:

Attesting Officer

GERALD J. MOSSINGHOFF
Commissioner of Patents and Trademarks